Sept. 9, 1969   C. F. BLINNE   3,466,020
HEATER FOR PLASTIC PIPE
Filed Dec. 28, 1967
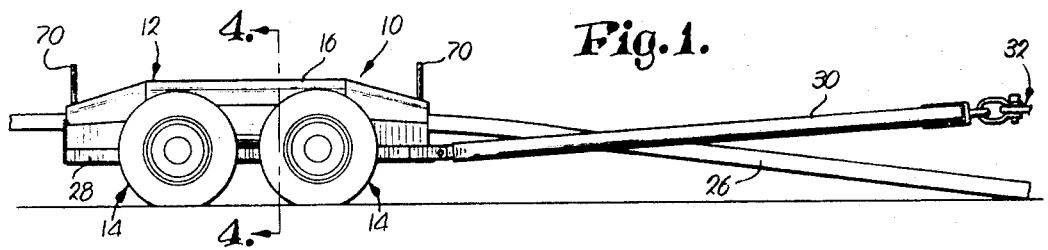
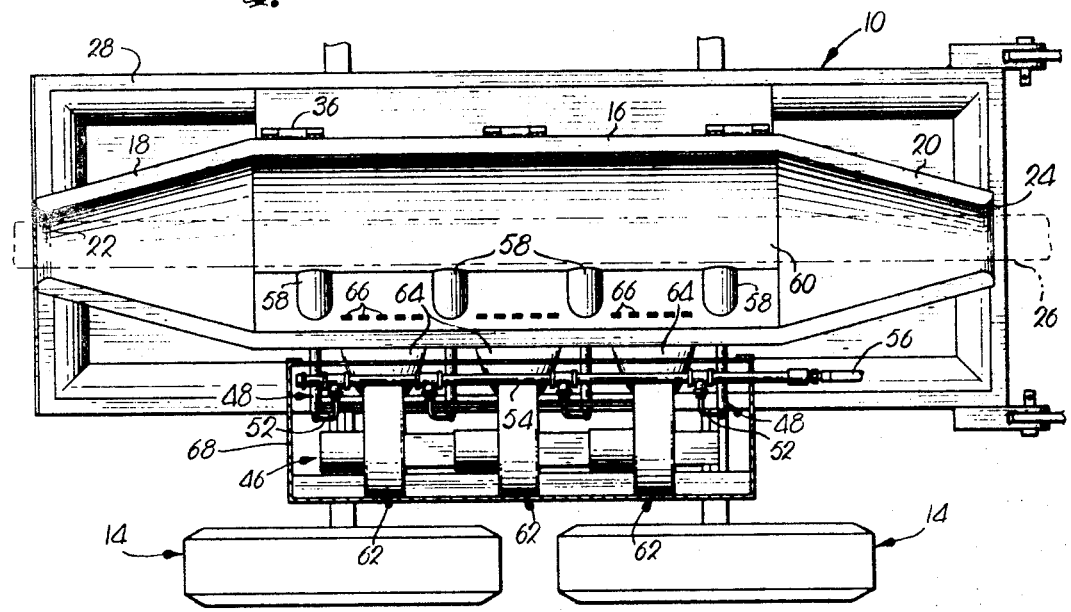
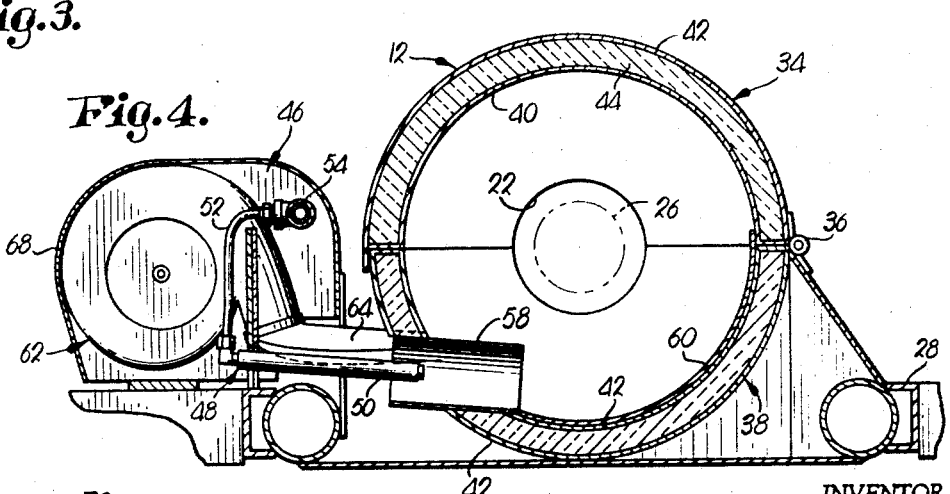
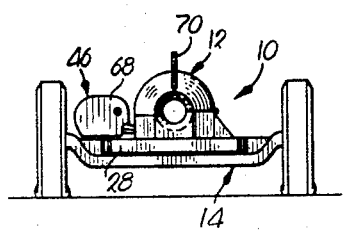
INVENTOR
Charles F. Blinne
BY Schmidt, Johnson, Hovey,
Williams & Bradley
ATTORNEYS.

United States Patent Office 3,466,020
Patented Sept. 9, 1969

3,466,020
HEATER FOR PLASTIC PIPE
Charles F. Blinne, P.O. Box 445,
Poplar Bluff, Mo. 63901
Filed Dec. 28, 1967, Ser. No. 694,336
Int. Cl. F27d 7/02
U.S. Cl. 263—4                            4 Claims

ABSTRACT OF THE DISCLOSURE

A machine for facilitating the laying of a continuous stretch of pipe, comprising an elongated tube having a pair of truncated cones at the ends, each cone having an opening slidably receiving the pipe. The tube is mounted on a mobile frame for advancement along the pipe. Burner and blower means carried on the frame direct heat and artificial currents of air into the tube to uniformly distribute heat over the pipe.

---

This invention relates to apparatus for laying pipe, and more particularly to a machine for heating a continuous stretch of pipe.

Plastic materials such as polyvinylchloride and the like are used for constructing pipe which has a relatively great tolerance for bending. This ability of plastic pipe to withstand bending has permitted pipe laying techniques wherein the stretch of pipe may be preassembled along a pipeline and subsequently installed into an underground ditch by mobile pipe laying equipment. Movement of the pipe from its preassembled position, through the pipe laying equipment, and into the ditch requires that the pipe be bent into arcs of relatively small radii, thus imparting severe bending stresses to the pipe. Care must be taken to avoid damage to the pipe resulting from these stresses.

Plastic materials of the type used for making pipe is relatively soft and pliable, and therefore less susceptible to breaking while being bent, when the material is relatively warm. As the temperature of the material lowers, the material becomes markedly more brittle. This characteristic of the pipe material has dictated that plastic pipe laying operations be carried out only in warm weather. Manifestly, this dependence upon ambient temperature has severly restricted or even completely eliminated the laying of plastic pipe during long periods of each year.

It is, therefore, a primary object of this invention to provide a machine to condition the pipe to withstand bending to permit the laying of plastic pipe without regard to the ambient temperature.

It is another important object of the invention to provide such a machine which may be utilized to condition long, continuous stretches of pre-assembled pipe directly in advance of the laying operation without need for auxiliary pipe lifting equipment.

It is a further object of the invention to provide a machine which uniformly distributes heat over the surface of the pipe, thereby avoiding concentrations of excessive heat which might damage the pipe.

Still another object of the invention is to provide a machine which may be quickly and easily installed on a continuous length of pipe, or removed therefrom, without need for uncoupling or cutting the pipe.

These and other important objects of the present invention will be further explained, or will become apparent from the description, claims and drawing.

In the drawing:

FIGURE 1 is a side elevational view of a machine embodying the principles of this invention;

FIG. 2 is a front elevational view thereof, the hitch having been removed for clarity;

FIG. 3 is an enlarged, fragmentary top plan view of the machine, the cover section having been removed to reveal details of construction; and FIG. 4 is an enlarged fragmentary, detailed cross-sectional view taken along line 4—4 of FIG. 1.

A machine embodying the principles of this invention is broadly designated with the reference numeral 10 and includes an elongated tube 12 mounted on ground engageable means in the nature of wheel and axle assemblies 14. Tube 12 includes an elongated cylindrical segment 16 and a pair of opposed truncated cone segments 18 and 20 disposed at the respective ends of tube 12.

Each of the cones 18 and 20 is provided with arcuate mouths 22 and 24 defining openings in the cones adapted to slidably receive an elongated pipe 26. The diameter of the openings defined by the mouths and 24 is substantially the same or only slightly greater than the outside diameter of the pipe 26 whereupon that portion of the pipe disposed within tube 12 is supported in generally axial alignment with the tube and in spaced concentric relationship from the tube.

Tube 12 is mounted on a rectangular frame 28 carried by assemblies 14 and V-shaped hitch 30 is hingedly secured to the front of carriage 28 for securing machine 10 to a prime mover 32 such as a tractor or the like. The prime mover 32 may straddle pipe 26 to pull machine 10 along the pipe as will be more fully explained.

Tube 12 includes an upper section 34 hingedly secured by hinge means 36 to a lower section 38 whereby the upper section 34 may be swung away from section 38 to expose the interior of the tube to permit placement of the pipe 26 therein. The sections 34 and 38 are constructed from spaced apart inner and outer walls 40 and 42 respectively and a layer 44 of thermally insulating material is sandwiched between the walls 40 and 42 as illustrated in FIG. 4 of the drawing.

Apparatus broadly designated 46 is mounted on frame 28 alongside tube 12 and includes a plurality of burners 48 spaced longitudinally along tube 12 and disposed to communicate with the interior of the latter. Each burner 48 includes a nozzle 50 coupled with a conduit 52 with a longitudinally extending manifold 54 which is adapted to be coupled with a source of fuel such as liquid petroleum or the like (not shown) by a conduit 56 (FIG. 3). An open ended cylinder 58 for each nozzle 50 is disposed in concentric relationship to the latter as illustrated in FIG. 4 and extends through the inner and outer walls 40 and 42 of the lower section 38 of tube 12. The cylinders 58 are disposed to direct flame emanating from the nozzle 50 generally tangential to the interior of the tube 12. An elongated, curvilinear liner 60 is secured to the inner surface of inner wall 40 of section 38 as illustrated in FIG. 4. Liner 60 serves to protect the tube from the flame which enters the interior of tube 12 and to direct the heat and flame in a generally circular direction within tube 12 and around pipe 26.

A blower 62 is interposed between each of the burners 48 and communicates with the interior of tube 12 through a conduit 64 which extends through the outer wall 42 of section 38 and abuts against the inner wall 40 thereof. A plurality of spaced apart longitudinally extending apertures 66 in inner wall 40 of section 38 aligned with the respective conduits 64 introduce artificial currents of air created by the blowers 62 into the interior of tube 12. Here again, the artificial currents of air enter in a generally tangential path of travel in tube 12 and create a swirling motion proceeding generally concentrically to the axis of the tube and around pipe 26. A cover 68 for apparatus 46 prevents entry of debris and foreign material into the blowers 62 and cover 68 is open at the bottom to provide a ready supply of air to the blowers.

Fore and aft upstanding rods 70 serve as handles for swinging cover section 34 to its open and closed positions with respect to the lower section 38.

In operation, cover section 34 is initially swung open to permit the continuous stretch of pipe 26 to be disposed in the position generally illustrated in the drawing without the necessity for uncoupling pipe 26. The cover section 34 is thereupon swung to its closed position and the burners 48 and blowers 62 are placed in operation. Machine 10 is advanced by prime mover 32 along the pipe and the operation of the blowers and burners uniformly distribute the heat emanating from the burners throughout the outer surface of the pipe as the latter moves through the advancing tube 12. The arcuate mouths 22 and 24 elevate the pipe as is necessary for traversing tube 12 and drop the pipe back to its initial position, all without skinning or otherwise damaging the pipe. It should be pointed out that the relatively low axis of tube 12 by virtue of the configuration of the wheel and axle assemblies 14 as illustrated best in FIG. 2, obviates the necessity for severely bending the pipe during advancement of machine 10. This prevents the introduction of substantial bending stresses to the pipe prior to the heating thereof by machine 10.

Not to be overlooked is the function of the blowers 68 to prevent an accumulation of heat at one particular zone within the tube. Such an accumulation could melt the pipe, especially upon slowing or stopping of machine 10. On the other hand, the blowers swirl the heat and flame within tube 12 and uniformly heat the material of the pipe wall. The insulation layer 44 serves to confine the heat within the tube and the products of combustion may escape along the pipe at either mouth 22 or 24 or they may, of course, escape through the cylinders 58.

If it is necessary to stop the advancement of machine 10, it is often desirable to swing cover section 34 to its open position to permit escape of the heat which might otherwise damage the pipe. The upstanding rods 70 rigidly secured to cover section 34 permit such swinging of the latter without endangering the workmen.

It is apparent that machine 10 provides a ready portable and efficient means for elevating the temperature of plastic pipe whereupon the pipe emanating at the rear of the machine is continued to permit a substantial bending without breaking even though the ambient temperature may be below that which is ordinarily safe for plastic pipe laying operations.

It is further contemplated that thermal sensing means and mechanism including a hydraulic cylinder assembly (not shown) might be provided for automatically swinging cover section 34 with respect to lower section 38. Thus, if the temperature of the pipe walls should reach a predetermined high level, the mechanism would automatically swing the cover section to an open or partially open position to permit heat to escape and thus avoid overheating the pipe.

Having thus described the invention, what is claimed as new and desired to be secured by Letters Patent is:

1. A machine for facilitating the bending of pipe formed of plastic material subject to destruction upon overheating during the field laying of a continuous stretch of such pipe in a cold environment in which the pipe without treatment would be relatively brittle and subject to breakage:

a mobile ground-supported carriage;

structure presenting a pipe-treating chamber mounted on the carriage for movement therewith in a direction longitudinally of the pipe;

means defining a pipe-clearing opening in each of the forward and rear extremities of the structure and providing spaced supports for a length of the pipe to be treated at an elevated position above the ground and in traversing relationship to the interior of the chamber as the carriage is advanced;

heating means on the carriage disposed to direct heat into the chamber at a zone of the latter spaced from the pipe; and mechanism for introducing artificial currents of air into the chamber in a direction for continuously diffusing and circulating the heat within the chamber to heat the latter to a temperature sufficient for warming the pipe to permit bending of the pipe but insufficient to cause destruction thereof.

2. The invention of claim 1, wherein said chamber is elongated and generally cylindrical, and said heating means and said mechanism are disposed to direct the paths of travel of the air and of the heat emanating from said mechanism and said heating means repsectively tangentially to said chamber.

3. The invention of claim 2, wherein said structure includes inner and outer, spaced-apart walls, and wherein is included a layer of thermal insulating material sandwiched between said walls.

4. The invention of claim 2, wherein said heating means includes a plurality of burners in spaced relationship along the length of said structure and said mechanism has a plurality of outlets intermediate said burners.

References Cited

UNITED STATES PATENTS

| 2,412,758 | 12/1946 | Smith | 263—2 |
| 2,416,412 | 2/1947 | Smith | 263—2 |
| 2,556,116 | 6/1951 | Smith | 263—2 |
| 3,020,907 | 2/1962 | Lease | 263—5 |
| 1,931,793 | 10/1933 | Gleason | 263—2 |

FOREIGN PATENTS 166,377   3/1959   Sweden.

JOHN J. CAMBY, Primary Examiner